(12) United States Patent
Igarashi et al.

(10) Patent No.: US 7,239,071 B2
(45) Date of Patent: Jul. 3, 2007

(54) FLUORESCENT LAMP AND DISPLAY APPARATUS HAVING A FLUORESCENT LAMP

(75) Inventors: Takahiro Igarashi, Kanagawa (JP); Tsuneo Kusunoki, Kanagawa (JP); Katsutoshi Ohno, Tokyo (JP)

(73) Assignee: Sony Corporation (JP)

( * ) Notice: Subject to any disclaimer, the term of this patent is extended or adjusted under 35 U.S.C. 154(b) by 61 days.

(21) Appl. No.: 11/122,082

(22) Filed: May 5, 2005

(65) Prior Publication Data

US 2005/0258733 A1 Nov. 24, 2005

(30) Foreign Application Priority Data

May 18, 2004 (JP) ............................ P2004-147887

(51) Int. Cl.
*H01J 1/62* (2006.01)
*H01J 63/04* (2006.01)
*C09K 11/02* (2006.01)

(52) U.S. Cl. ................. 313/487; 313/486; 252/301.4 R

(58) Field of Classification Search ........ 313/485–487; 252/301.4 R

See application file for complete search history.

(56) References Cited

U.S. PATENT DOCUMENTS

| 2001/0010367 A1* | 8/2001 | Burnell-Jones ........ 252/301.36 |
| 2004/0130256 A1* | 7/2004 | Juestel et al. ............... 313/487 |
| 2006/0170319 A1* | 8/2006 | Oku et al. ................... 313/116 |

FOREIGN PATENT DOCUMENTS

| JP | 2001-110309 | 4/2001 |
| JP | 2003-045329 | 2/2003 |
| JP | 2003-151496 | 5/2003 |
| JP | 2003-331785 | 11/2003 |
| WO | WO 200295791 A1 * | 11/2002 |

OTHER PUBLICATIONS

JPO Office Action, JP 2004-147887, Dated Issued Dec. 26, 2006, 3 pages.

* cited by examiner

*Primary Examiner*—Karabi Guharay
*Assistant Examiner*—Peter Macchiarolo
(74) *Attorney, Agent, or Firm*—Rader Fishman & Grauer PLLC; Ronald P. Kananen

(57) ABSTRACT

There is provided a fluorescent lamp having a construction where no difference is surely caused between a composition of the fluorescent particle mixture at one end portion of the glass tube and a composition of the fluorescent particle mixture at another end portion of the glass tube. The fluorescent lamp includes the glass tube and a fluorescent particle layer, formed on the inner surface of the glass tube, and including a fluorescent particle mixture of blue light emitting fluorescent particles having an average specific gravity of 4.0±0.4, red light emitting fluorescent particles having an average specific gravity of 4.0±0.4, and green light emitting fluorescent particles having an average specific gravity of 4.0±0.4, wherein the fluorescent particle mixture forming the fluorescent particle layer has a specific gravity of 4.0±0.4.

8 Claims, 1 Drawing Sheet

FLUORESCENT LAMP AND DISPLAY APPARATUS HAVING A FLUORESCENT LAMP

CROSS REFERENCES TO RELATED APPLICATIONS

The present document contains subject matter related to Japanese Patent Applications JP 2004-147887 filed in the Japanese Patent Office on May 18, 2004, the entire contents of which are incorporated herein by reference.

BACKGROUND OF THE INVENTION

1. Field of the Invention

The present invention relates to a fluorescent lamp and a display apparatus having the fluorescent lamp.

2. Description of Related Art

In recent years, as a source of back light for liquid crystal display apparatuses used in personal computers and the like, a cold cathode-type fluorescent lamp, which has a long life and generates little heat, is widely used. In the fluorescent lamp, as shown in a diagrammatic cross-sectional view of FIG. 1(A), a glass tube 11 is sealed at both ends by a dumet wire 12 including, for example, a copper-clad iron alloy and bead glass 13. To the tip portion of the dumet wire 12 positioned inside of the glass tube 11 is fitted an electrode 14 comprising sintered metal obtained by sintering metal powder of tungsten or hafnium or a mixture thereof, and may also comprise nickel, niobium, or the like. A fluorescent particle layer 15 is formed on the inner surface of the glass tube 11, and the glass tube 11 is filled with a mixed rare gas, such as neon gas, argon and the like, and may have also have mercury dispersed therein.

In the production of the fluorescent lamp, generally, a fluorescent material slurry comprising a fluorescent particle mixture of blue light emitting fluorescent particles, red light emitting fluorescent particles, and green light emitting fluorescent particles is applied to the inner surface of a glass tube to form a fluorescent material slurry layer. There is a vast difference in specific gravity between the blue light emitting fluorescent particles, red light emitting fluorescent particles, and green light emitting fluorescent particles used. Therefore, if the fluorescent material slurry is applied to the inner surface of the glass tube, the difference of specific gravity between the fluorescent particles causes a difference in the state of flow between the blue light emitting fluorescent particles, the red light emitting fluorescent particles, and the green light emitting fluorescent particles in the fluorescent material slurry. In other words, the fluorescent particles having a higher specific gravity flow more quickly and the fluorescent particles having a lower specific gravity flow more slowly. Consequently, a difference is caused between the composition of the fluorescent particle mixture forming a portion of the fluorescent particle layer formed on the inner surface of the glass tube 11 at one end portion (hereinafter, for convenience sake, this mixture is frequently referred to as a "fluorescent particle mixture at one end portion of the glass tube") and the composition of the fluorescent particle mixture forming a portion of the fluorescent particle layer formed on the inner surface of the glass tube 11 at another end portion (hereinafter, for convenience' sake, this mixture is frequently referred to as a "fluorescent particle mixture at another end portion of the glass tube"), so that a phenomenon occurs wherein the glass tube 11 has a difference in luminescent color between one end portion and another end portion. The difference between the fluorescent particle mixture at one end portion of the glass tube and the fluorescent particle mixture at another end portion of the glass tube is means a difference in the ratio of the blue light emitting fluorescent particles, the red light emitting fluorescent particles, and the green light emitting fluorescent particles at the respective end portions of the glass tube, and this meaning applies to the following descriptions. The above described difference in the luminescent color is recognized as an uneven display in the liquid crystal display apparatus.

[Patent document 1] Japanese Patent Application Publication (KOKAI) No. 2003-45329

SUMMARY OF THE INVENTION

A technique for preventing uneven coating in the application of the fluorescent material slurry to the inner surface of the glass tube 11 forming a fluorescent lamp has been disclosed in, for example, Japanese Patent Application Publication No. 2003-45329. However, even when using the technique disclosed in Japanese Patent Application Publication No. 2003-45329, it is difficult to prevent the occurrence of a phenomenon such that a difference is caused between the composition of the fluorescent particle mixture at one end portion of the glass tube and the composition of the fluorescent particle mixture at another end portion of the glass tube.

Accordingly, it is desirable to provide a fluorescent lamp having a construction in which no difference is caused between the composition of the fluorescent particle mixture at one end portion of the glass tube and the composition of the fluorescent particle mixture at another end portion of the glass tube and a display apparatus having the fluorescent lamp.

The fluorescent lamp according to an embodiment of the present invention includes:

(A) a glass tube; and (B) a fluorescent particle layer, formed on the inner surface of the glass tube, and having a fluorescent particle mixture of blue light emitting fluorescent particles, red light emitting fluorescent particles, and green light emitting fluorescent particles, wherein the blue light emitting fluorescent particles have an average specific gravity of 4.0±0.4, wherein the red light emitting fluorescent particles have an average specific gravity of 4.0±0.4, wherein the green light emitting fluorescent particles have an average specific gravity of 4.0±0.4, and wherein the fluorescent particle mixture forming the fluorescent particle layer has a specific gravity of 4.0±0.4.

The fluorescent lamp according to another embodiment of the present invention includes:

(A) a glass tube; and (B) a fluorescent particle layer, formed on the inner surface of the glass tube, and having a fluorescent particle mixture of blue light emitting fluorescent particles, red light emitting fluorescent particles, and green light emitting fluorescent particles, wherein if a specific gravity of the fluorescent particle mixture forming a portion of the fluorescent particle layer formed on the inner surface of the glass tube at one end portion is taken as $\rho_1$ and a specific gravity of the fluorescent particle mixture forming a portion of the fluorescent particle layer formed on the inner surface of the glass tube at another end portion is taken as $\rho_2$, the following relationships are satisfied:

$\rho_1 = 4.0 \pm 0.4$, $\rho_2 = 4.0 \pm 0.4$, and $|\rho_1 - \rho_2| \leq 0.4$.

The display apparatus according to an embodiment of the present invention has a fluorescent lamp that includes:

(A) a glass tube; and (B) a fluorescent particle layer, formed on the inner surface of the glass tube, and having a fluorescent particle mixture of blue light emitting fluorescent particles, red light emitting fluorescent particles, and green light emitting fluorescent particles, wherein the blue light emitting fluorescent particles have an average specific gravity of $4.0 \pm 0.4$, wherein the red light emitting fluorescent particles have an average specific gravity of $4.0 \pm 0.4$, wherein the green light emitting fluorescent particles have an average specific gravity of $4.0 \pm 0.4$, and wherein the fluorescent particle mixture forming the fluorescent particle layer has a specific gravity of $4.0 \pm 0.4$.

The display apparatus according to another embodiment of the present invention has a fluorescent lamp that includes:

(A) a glass tube; and (B) a fluorescent particle layer, formed on the inner surface of the glass tube, and having a fluorescent particle mixture of blue light emitting fluorescent particles, red light emitting fluorescent particles, and green light emitting fluorescent particles, wherein if a specific gravity of the fluorescent particle mixture forming a portion of the fluorescent particle layer formed on the inner surface of the glass tube at one end portion is taken as $\rho_1$ and a specific gravity of the fluorescent particle mixture forming a portion of the fluorescent particle layer formed on the inner surface of the glass tube at another end portion is taken as $\rho_2$, the following relationships are satisfied:

$\rho_1 = 4.0 \pm 0.4$, $\rho_2 = 4.0 \pm 0.4$, and $|\rho_1 - \rho_2| \leq 0.4$.

In the fluorescent lamps according to the embodiments of the present invention, or the display apparatus according to the embodiments of the present invention (hereinafter referred to simply as "the present invention"), it is preferred that if chromaticity coordinates of the luminescent color from the fluorescent particle mixture forming a portion of the fluorescent particle layer formed on the inner surface of the glass tube at one end portion (hereinafter this mixture is referred to as a "fluorescent particle mixture at one end portion of the glass tube") are taken as $(x_1, y_1)$, and if chromaticity coordinates of the luminescent color from the fluorescent particle mixture forming a portion of the fluorescent particle layer formed on the inner surface of the glass tube at another end portion (hereinafter this mixture is referred to as the "fluorescent particle mixture at another end portion of the glass tube") are taken as $(x_2, Y_2)$, the following formula is satisfied:

$[(x_2-x_1)^2 + (y_2-y_1)^2]^{0.5} \leq 0.03$, desirably $[(x_2-x_1)^2 + (y_2-y_1)^2]^{0.5} \leq 0.2$.

The chromaticity coordinates are defined in the CIE 1931 chromaticity diagram.

In the following descriptions, the value of $[(x_2-x_1)^2 + (y_2-y_1)^2]^{0.5}$ is frequently referred to as the "chromaticity difference $\Delta E$".

In the present invention, the effective length (L) of the glass tube and the internal diameter of the glass tube may be determined depending on the required specifications of the fluorescent lamp, and there may be mentioned an example of construction in which the effective length (L) of the glass tube is 0.5 m or more and the internal diameter of the glass tube is 1.5 to 3.0 mm. The effective length L of the glass tube means the length of a portion, where the fluorescent particle layer is substantially formed, the portion being part of the inner surface of the glass tube, which length is shorter than the overall length (L') of the glass tube.

In the fluorescent lamp or display apparatus according to an embodiment of the present invention, the fluorescent particle mixture forming the fluorescent particle layer has a specific gravity $\rho$ of $4.0 \pm 0.4$, and it is preferable that the portion of the fluorescent particle layer, at which the specific gravity p of the fluorescent particle mixture forming the fluorescent particle layer is measured, has a portion of the fluorescent particle layer formed on the inner surface of the glass tube at one end portion and a portion of the fluorescent particle layer formed on the inner surface of the glass tube at another end portion. In this case, an average of the measurement values of specific gravity of these portions of the fluorescent particle layer may be used as the specific gravity p of the fluorescent particle mixture forming the fluorescent particle layer.

In the fluorescent lamp or display apparatus according to an embodiment of the present invention, it is preferable that the fluorescent particle mixture at one end portion of the glass tube has a specific gravity $\rho_1$ and the fluorescent particle mixture at another end portion of the glass tube has a specific gravity $\rho_2$ wherein $|\rho_1 - \rho_2| \leq 0.4$ is satisfied.

In the present invention, if the effective length of the glass tube is taken as L, the portion of the fluorescent particle layer formed on the inner surface of the glass tube at one end portion means a portion of the fluorescent particle layer positioned 0.02 L through 0.04 L from, for example, one end of the glass tube (more specifically, one end of the portion of the glass tube having the inner surface on which the fluorescent particle layer is to be formed) in the direction to the middle, and the portion of the fluorescent particle layer formed on the inner surface of the glass tube at another end portion means a portion of the fluorescent particle layer positioned 0.02 L through 0.04 L from, for example, another end of the glass tube (more specifically, another end of the portion of the glass tube having the inner surface on which the fluorescent particle layer is to be formed) in the direction to the middle.

In the present invention, a specific gravity of the fluorescent particles (a specific gravity PB of the blue light emitting fluorescent particles, a specific gravity PR of the red light emitting fluorescent particles, and a specific gravity PG of the green light emitting fluorescent particles) or density may be measured by a method using a pycnometer (specific gravity bottle). A specific gravity ($\rho$) or a density of the fluorescent particle mixture forming the fluorescent particle layer can be obtained by taking the fluorescent particle layer on the inner surface of the glass tube at the predetermined portion mentioned above by scraping and measuring a specific gravity or density of the fluorescent particle mixture taken by the above method.

In the present invention, it is preferred that the glass tube forming the fluorescent lamp is formed from hard glass having a resistance to heat at about 600° C. The fluorescent lamp may be linear (straight tube), U-shaped, continuous U-shaped, S-shaped, continuous S-shaped, W-shaped, or the like, which form may be determined depending on the required specifications of the fluorescent lamp.

In the present invention, an example of the blue light emitting fluorescent particles is $BaMgAl_{10}O_{17}$:Eu (hereinafter, frequently referred to as "BAM:Eu") having a specific gravity ($\rho_B$) of 3.8. An example of the red light emitting fluorescent particles is $YVO_4$:Eu (hereinafter, frequently referred to as "YVO") having a specific gravity ($\rho_R$) of 4.3. An example of the green light emitting fluorescent particles is $BaMgAl_{10}O_{17}$:Eu, Mn (hereinafter, frequently referred to as "BAM:Eu, Mn") having a specific gravity (PG) of 3.8. In the present invention, the fluorescent particles for each color may include either one type of fluorescent particles or two or more types of fluorescent particles. In the case where the fluorescent particles for each color includes one type of fluorescent particle, the specific gravity of the one type of fluorescent particle forming the fluorescent particles for each color corresponds to the average specific gravity PB, $\rho_R$, $\rho_G$. On the other hand, in the case where the fluorescent particles for each color includes two or more types of fluorescent particles, if the specific gravity of each of the two types or more of fluorescent particles (I types of fluorescent particles) forming the fluorescent particles for each color is taken as $\rho_i$ (wherein i=1, 2, . . . , and I) and each ratio is taken as $w_i$ (wherein the sum of $w_i$ (i=1 to I) is 1), an average specific gravity is represented by $\Sigma(\rho_i \cdot w_i)$. Symbol "$\Sigma$" means the total amount of i=1 to I. For example, as the green light emitting fluorescent particles, a mixture of BAM:Eu, Mn [ratio $w_{G-1}$] having a specific gravity of 3.8 (=$\rho_{G-1}$) and $LaPO_4$:Ce, Tb (hereinafter, frequently referred to as "LaP") [ratio $w_{G-2}$] having a specific gravity of 5.2 (=$\rho_{G-2}$) may be used, and, in this case, the green light emitting fluorescent particles collectively (i.e., mixture of the BAM:Eu, Mn fluorescent particles and the LaP fluorescent particles) may be required to satisfy an average specific gravity $\rho_G$ (=$\rho_{G-1} \cdot w_{G-1} + \rho_{G-2} \cdot w_{G-2}$, wherein $w_{G-1}+w_{G-2}=1$) of 4.0±0.4.

In the present invention, it is preferred that the blue light emitting fluorescent particles, the red light emitting fluorescent particles, and the green light emitting fluorescent particles are mixed in a ratio (composition of the fluorescent particle mixture) such that the chromaticity coordinates of the luminescent color from the middle portion of the fluorescent lamp become, for example, (0.275, 0.275). As a preferred example of the composition, there may be mentioned the following composition:

blue light emitting fluorescent particles: 5 to 40% by weight;

red light emitting fluorescent particles: 25 to 75% by weight;

green light emitting fluorescent particles: 20 to 60% by weight;

and this composition may achieve white display. It is noted that the total amount of the blue light emitting fluorescent particles, the red light emitting fluorescent particles, and the green light emitting fluorescent particles is 100% by weight. For example, when as the green light emitting fluorescent particles a mixture of BAM:Eu, Mn and LaP is used, it is preferable that the LaP content is 18% by weight or less, based on the weight of the fluorescent particle mixture.

The fluorescent lamp of the present invention involves a cold cathode fluorescent lamp and a hot cathode fluorescent lamp. In the display apparatus of the present invention, for example, the fluorescent lamp is used as a source of back light into the display apparatus. Examples of the display apparatuses include a liquid crystal display apparatus. Examples of systems of back light include a direct system (also called a reflective system) and an edge light system (also called a light guide plate system or a side light system).

In the fluorescent lamp or display apparatus according to an embodiment of the present invention, the average specific gravities of the blue light emitting fluorescent particles, the red light emitting fluorescent particles, and the green light emitting fluorescent particles are specified individually and the specific gravity of the fluorescent particle mixture forming the fluorescent particle layer is specified. In the fluorescent lamp or display apparatus according to another embodiment of the present invention, the values of specific gravities $\rho_1$, $\rho_2$ of the fluorescent particle mixtures forming portions of the fluorescent particle layers formed on the inner surface of the glass tube at one end portion and another end portion and a difference between the specific gravities are specified. Therefore, if a fluorescent material slurry including a fluorescent particle mixture of the blue light emitting fluorescent particles, the red light emitting fluorescent particles, and the green light emitting fluorescent particles is applied to the inner surface of the glass tube to form a fluorescent material slurry layer, a difference in the state of flow between the blue light emitting fluorescent particles, the red light emitting fluorescent particles, and the green light emitting fluorescent particles in the fluorescent material slurry is unlikely to be caused. Consequently, a difference is unlikely to be caused between the composition of the fluorescent particle mixture at one end portion of the glass tube and the composition of the fluorescent particle mixture at another end portion of the glass tube. That is, in contrast to the conventional technique, a phenomenon is unlikely to occur in which a difference in luminescent color between one end portion and another end portion of the glass tube is caused, and hence it is possible to achieve a fluorescent lamp providing uniform light emission, so that an uneven display in the liquid crystal display apparatus is unlikely to be caused.

DESCRIPTION OF THE PREFERRED EMBODIMENTS

Figure 1A:
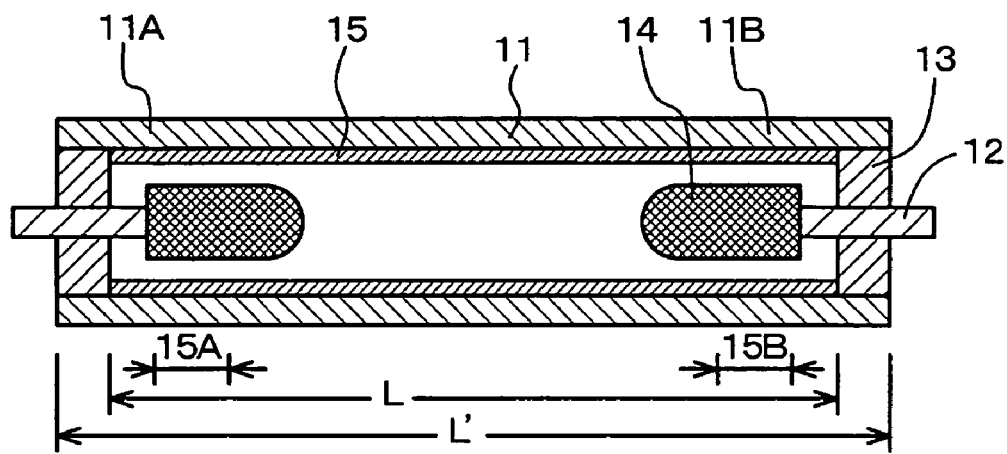
FIG. 1A is a diagrammatic cross-sectional view of a fluorescent lamp.

Hereinafter, the present invention will be described with reference to the drawing and the following Examples.

Example 1

Example 1 relates to the fluorescent lamp and display apparatus according to the embodiments of the present invention. In Example 1, the display apparatus is specifically a liquid crystal display apparatus, and the fluorescent lamp is used as a source of back light for the liquid crystal display apparatus.

Specifically, the fluorescent lamp in Example 1 is a fluorescent lamp, shown in a diagrammatic cross-sectional view of FIG. 1(A), including:

(A) a glass tube 11; and (B) a fluorescent particle layer 15, formed on the inner surface of the glass tube 11, and having a fluorescent particle mixture of blue light emitting fluorescent particles, red light emitting fluorescent particles, and green light emitting fluorescent particles.

The blue light emitting fluorescent particles have an average specific gravity of 4.0±0.4, the red light emitting fluorescent particles have an average specific gravity of 4.0±0.4, the green light emitting fluorescent particles have an average specific gravity of 4.0±0.4, and the fluorescent particle mixture forming the fluorescent particle layer has a specific gravity of 4.0±0.4.

Alternatively, if the specific gravity of the fluorescent particle mixture forming a portion 15A of the fluorescent particle layer formed on the inner surface of the glass tube 11$a$ tone end portion 11A is taken as $\rho_1$ and the specific gravity of the fluorescent particle mixture forming a portion 15B of the fluorescent particle layer formed on the inner surface of the glass tube 11 at another end portion 11B is taken as $\rho_2$, the relationships $\rho_1=4.0\pm0.4$, $\rho_2=4.0\pm0.4$, and $|\rho_1-\rho_2|\leqq 0.4$ are satisfied.

The display apparatus in Example 1 includes the fluorescent lamp having the above-mentioned characteristic feature.

In the fluorescent lamp in Example 1 or the fluorescent lamp used in the display apparatus in Example 1, chromaticity coordinates $(x_1, y_1)$ of the luminescent color from the fluorescent particle mixture at one end portion of the glass tube and chromaticity coordinates $(x_2, y_2)$ of the luminescent color from the fluorescent particle mixture at another end portion of the glass tube satisfy the following formula: chromaticity difference $\Delta E=[(x_2-x_1)^2+(y_2-y_1)^2]^{0.5}\leqq 0.02$.

In Example 1, specifically, as blue light emitting fluorescent particles, red light emitting fluorescent particles, and green light emitting fluorescent particles, the fluorescent particles shown in Table 1 below were used. The fluorescent particles indicated by symbols ○ (open circles) shown in Table 1 were used. Nitrocellulose was used as a binder, and a dispersion having a [butyl acetate:nitrocellulose] weight ratio of 49:1 was prepared. The fluorescent particle mixture of the blue light emitting fluorescent particles, the red light emitting fluorescent particles, and the green light emitting fluorescent particles was dispersed in the dispersion so that the [fluorescent particle mixture:dispersion] weight ratio became 1:1 to prepare a fluorescent material slurry. A glass tube made of hard glass having an internal diameter of 2.0 mm, an outer diameter of 3.0 mm, a overall length (L') of 100.5 cm, and an effective length (L) of 100 cm was used. With respect to the overall length (L') and the effective length (L), reference is made to FIG. 1(A). With respect to the fluorescent particle mixture, the blue light emitting fluorescent particles, the red light emitting fluorescent particles, and the green light emitting fluorescent particles were mixed in a ratio (composition of the fluorescent particle mixture) adjusted so that the chromaticity coordinates of the luminescent color from the middle portion of the fluorescent lamp became (0.275, 0.275). For example, if the blue light emitting fluorescent particles, the red light emitting fluorescent particles, and the green light emitting fluorescent particles are mixed in the composition blue light emitting fluorescent particles: 5 to 40% by weight, red light emitting fluorescent particles: 25 to 75% by weight, green light emitting fluorescent particles: 20 to 60% by weight, so that the total amount becomes 100% by weight, it is possible to be achieve a white display at a desired chromaticity difference $\Delta E$ and a desired specific gravity difference $(\Delta\rho=|\rho_1-\rho_2|)$. The above-described matter applies to Example 2 and the Comparative Example mentioned below, and the above-described procedure was conducted similarly in Example 2 and the Comparative Example below.

TABLE 1

| Fluorescent material | | Specific gravity | Weight average particle size | Example 1 | Example 2 | Comparative Example |
|---|---|---|---|---|---|---|
| Blue light emitting | BaMgAl$_{10}$O$_{17}$: Eu | 3.8 | 4 μm | ○ | ○ | ○ |
| Green light emitting | BaMgAl$_{10}$O$_{17}$: Eu, Mn | 3.8 | 4 μm | ○ | ○ | |
| | LaPO$_4$: Ce, Tb | 5.2 | 4 μm | | | ○ |
| Red light emitting | YVO$_4$: Eu | 4.3 | 7 μm | ○ | ○ | |
| | Y$_2$O$_3$: Eu | 5.1 | 7 μm | | | ○ |

TABLE 2

| | Chromaticity coordinates | Chromaticity difference ($\Delta E$) | Specific gravity ($\rho_1$) | Specific gravity ($\rho_2$) | Specific gravity difference ($\Delta\rho$) |
|---|---|---|---|---|---|
| Example 1 | (0.273, 0.276) | 0.010 | 3.90 | 4.11 | 0.21 |
| Example 2 | (0.276, 0.276) | 0.017 | 3.95 | 4.25 | 0.30 |
| Comparative Example | (0.274, 0.276) | 0.034 | 4.26 | 4.93 | 0.67 |

Figure 1B:
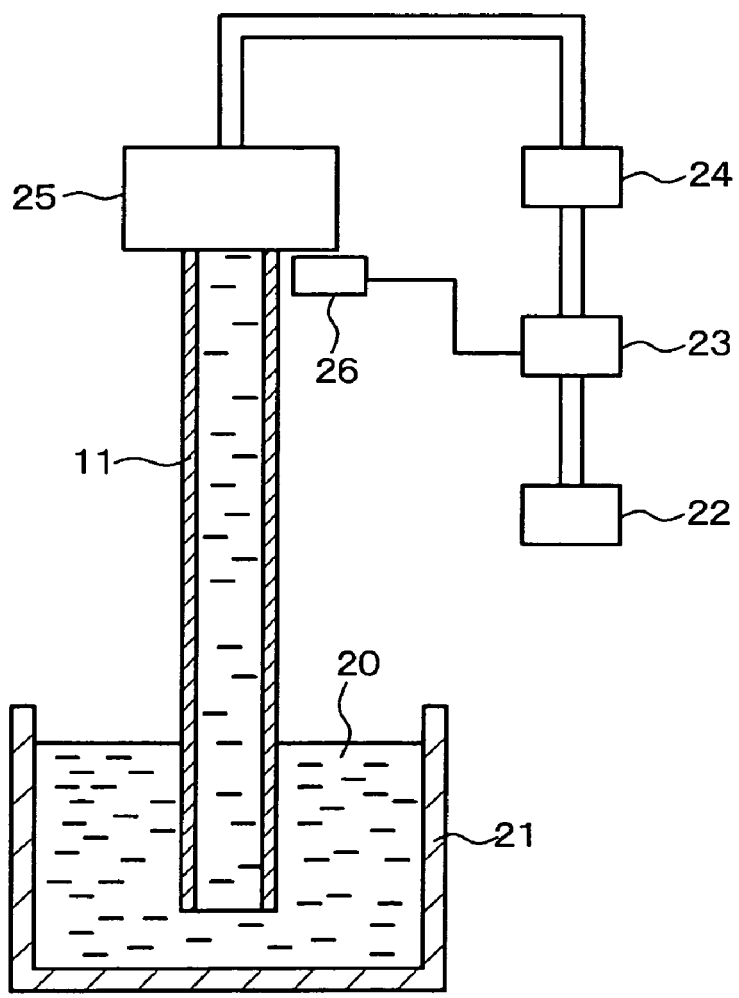
FIG. 1B is a diagram showing a method of applying fluorescent material slurry on an inner surface of a glass tube.

In Example 1, as shown in FIG. 1(B), the lower end of the glass tube 11 is dipped in a fluorescent material slurry 20 in a vessel 21 having the temperature controlled by heating by means of a not shown heater or the like, and then, a vacuum pump 22 and a solenoid valve 23 are actuated to evacuate the glass tube 11 through a reducing valve 24 and a suction head 25. When the glass tube 11 is evacuated, the fluorescent material slurry 20 in the vessel 21 rises. At a point in time when the level of the fluorescent material slurry 20 has reached a predetermined height, a level gage 26 detects the level of the fluorescent material slurry 20 to close the solenoid valve 23 and then the pressure in the glass tube 11 becomes atmospheric pressure, so that the level of the fluorescent material slurry 20 goes down naturally. Thus, the fluorescent material slurry including the fluorescent particle mixture of the blue light emitting fluorescent particles, the red light emitting fluorescent particles, and the green light emitting fluorescent particles is applied to the inner surface of the glass tube 11 to form a fluorescent material slurry layer on the inner surface of the glass tube 11. Then, the glass tube 11 is placed in an electric furnace, and the air atmosphere in the electric furnace is heated to about 600° C. while introducing air (temperature: about 600° C.) at 25 liters/minute into the glass tube 11 to sinter the fluorescent material slurry layer formed on the inner surface of the glass tube 11, thus forming a fluorescent particle layer 15 including the fluorescent particle mixture of the blue light emitting fluorescent particles, the red light emitting fluorescent particles, and the green light emitting fluorescent particles on the inner surface of the glass tube 11.

For evaluation, with respect to the thus obtained glass tube 11, a portion 15A of the fluorescent particle layer formed on the inner surface of the glass tube at one end portion and a portion 15B of the fluorescent particle layer formed on the inner surface of the glass tube at another end portion were removed by scraping. More specifically, the portion 15A of the fluorescent particle layer positioned 3 cm±1 cm (0.02 L through 0.04 L) from one end of the glass tube and the portion 15B of the fluorescent particle layer positioned 3 cm±1 cm (0.02 L through 0.04 L) from another end of the glass tube were removed by scraping. Then, the removed fluorescent particle mixtures forming the removed portions 15A, 15B of the fluorescent particle layers were individually irradiated with light from a mercury lamp to measure a chromaticity by a spectrophotometer. Separately, a specific gravity ($\rho_1$, $\rho_2$) of each of the removed fluorescent particle mixtures forming the portions 15A, 15B of the fluorescent particle layers was measured. The chromaticity coordinates, chromaticity difference $\Delta E$, specific gravity ($\rho_1$, $\rho_2$), and specific gravity difference $\Delta \rho$ with respect to each of the fluorescent particle mixtures are shown in Table 2. The above-described procedure was conducted similarly in Example 2 and the Comparative Example mentioned below.

Using the glass tube 11 obtained, a fluorescent lamp (see FIG. 1(A)) was assembled by a known method, and then the fluorescent lamp was used as a source of back light in a liquid crystal display apparatus. No uneven display was recognized in the liquid crystal display apparatus.

A fluorescent lamp in Comparative Example was produced. In the present Comparative Example, the fluorescent particles shown in Table 1 were used. Specifically, in the present Comparative Example, as the green light emitting fluorescent particles, LaP was used, and, as the red light emitting fluorescent particles, $Y_2O_3$:Eu was used. A fluorescent particle layer was formed on the inner surface of the glass tube 11 in the same manner as in Example 1, and then an evaluation was conducted in the same manner as in Example 1. The results are shown in Table 2. Using the glass tube obtained, a fluorescent lamp was assembled by a known method, and then the fluorescent lamp was used as a source of back light in a liquid crystal display apparatus. An uneven display was recognized in the liquid crystal display apparatus.

Example 2

Example 2 is a variation on Example 1. In Example 2, as the blue light emitting fluorescent particles, the red light emitting fluorescent particles, and the green light emitting fluorescent particles, the fluorescent particles shown in Table 1 were used. In Example 2, as the green light emitting fluorescent particles, a mixture of BAM:Eu, Mn and LaP was used, and the LaP content was 18% by weight or less, based on the weight of the fluorescent particle mixture. The green light emitting fluorescent particles collectively (i.e., mixture of the BAM:Eu, Mn fluorescent particles and the LaP fluorescent particles) had an average specific gravity $\rho_G$ of 4.5.

A fluorescent particle layer was formed on the inner surface of the glass tube 11 in the same manner as in Example 1, and then an evaluation was conducted in the same manner as in Example 1. The results are shown in Table 2. Using the glass tube 11 obtained, a fluorescent lamp was assembled by a known method, and then the fluorescent lamp was incorporated as a source of back light into a liquid crystal display apparatus. Like Example 1, no uneven display was recognized in the liquid crystal display apparatus.

Hereinabove, the present invention is described with reference to the preferred examples, but the present invention is not limited to the above examples. The construction and structure of the fluorescent lamp and the compositions and specifications of the materials and members used in the production of the fluorescent lamp described in the above examples are merely examples and can be appropriately changed.

The invention claimed is:

1. A fluorescent lamp comprising:
   (A) a glass tube; and
   (B) a fluorescent particle layer, formed on an inner surface of the glass tube, having a fluorescent particle mixture of blue light emitting fluorescent particles, red light emitting fluorescent particles, and green light emitting fluorescent particles,
   wherein said fluorescent particle mixture is selected from the group consisting of $BaMgAl_{10}O_{17}$:Eu//$BaMgAl_{10}O_{17}$:Eu, Mn//$YVO_4$:Eu and $BaMgAl_{10}O_{17}$:Eu//$BaMgAl_{10}O_{17}$:Eu, Mn; $LaPo_4$:Ce, Tb//$YVO_4$:Eu, wherein the blue light emitting fluorescent particles have an average specific gravity of 4.0±0.4,
   wherein the red light emitting fluorescent particles have an average specific gravity of 4.0±0.4,
   wherein the green light emitting fluorescent particles have an average specific gravity of 4.0±0.4, and
   wherein the fluorescent particle mixture forming the fluorescent particle layer has a specific gravity of 4.0±0.4.

2. The fluorescent lamp according to claim 1, wherein, if a chromaticity coordinate of a luminescent color of a fluorescent particle mixture forming a portion of the fluorescent particle layer formed on the inside surface at one end of the glass tube is taken as (x1, y1), and a chromaticity coordinate of a luminescent color of a fluorescent particle mixture forming a portion of the fluorescent particle layer formed on the inside surface at another end of the glass tube is taken as (x2, y2), the following formula is satisfied:

$[(x_2-x_1)^2+(y_2-y_1)^2]^{0.5} \leq 0.02.$

3. The fluorescent lamp according to claim 1, wherein an effective length of the glass tube is 0.5 m or more and an internal diameter of the glass tube is 1.5 to 3.0 mm.

4. A fluorescent lamp comprising:
   (A) a glass tube; and
   (B) a fluorescent particle layer, formed on an inner surface of the glass tube, having a fluorescent particle mixture of blue light emitting fluorescent particles, red light emitting fluorescent particles, and green light emitting fluorescent particles, wherein said fluorescent particle mixture is selected from the group consisting of $BaMgAl_{10}O_{17}$:Eu//$BaMgAl_{10}O_{17}$:Eu, Mn//$YVO_4$:Eu and $BaMgAl_{10}O_{17}$:Eu//$BaMgAl_{10}O_{17}$:Eu, Mn; $LaPo_4$:Ce, Tb//$YVO_4$:Eu, wherein if a specific gravity of the fluorescent particle mixture forming a portion of the fluorescent particle layer formed on the inner surface of the glass tube at one end portion is taken as $\rho_1$, and a specific gravity of the fluorescent particle mixture forming a portion of the fluorescent particle layer formed on the inner surface of the glass tube at another end portion is taken as $\rho_2$, the following formulas are satisfied:

$\rho_1 = 4.0 \pm 0.4$, $\rho_2 = 4.0 \pm 0.4$, and $|\rho_1 - \rho_2| \leq 0.4$.

5. The fluorescent lamp according to claim 4, wherein, if a chromaticity coordinate of a luminescent color of a fluorescent particle mixture forming a portion of the fluorescent particle layer formed on the inside surface at one end of the glass tube is taken as (x1, y1), and a chromaticity coordinate of a luminescent color of a fluorescent particle mixture forming a portion of the fluorescent particle layer formed on the inside surface at another end of the glass tube is taken as (x2, y2), the following formula is satisfied:

$[(x_2-x_1)^2+(y_2-y_1)^2]^{0.5} \leq 0.02$.

6. The fluorescent lamp according to claim 4, wherein an effective length of the glass tube is 0.5 m or more and an internal diameter of the glass tube is 1.5 to 3.0 mm.

7. A display apparatus comprising a fluorescent lamp, wherein the fluorescent lamp includes:

(A) a glass tube; and (B) a fluorescent particle layer, formed on an inner surface of the glass tube, having a fluorescent particle mixture of blue light emitting fluorescent particles, red light emitting fluorescent particles, and green light emitting fluorescent particles, wherein said fluorescent particle mixture is selected from the group consisting of $BaMgAl_{10}O_{17}$:Eu//$BaMgAl_{10}O_{17}$:Eu, Mn//$YVO_4$:Eu and $BaMgAl_{10}O_{17}$:Eu//$BaMgAl_{10}O_{17}$:Eu, Mn; $LaPo_4$:Ce, Tb//$YVO_4$:Eu, wherein the blue light emitting fluorescent particles have an average specific gravity of $4.0 \pm 0.4$, wherein the red light emitting fluorescent particles have an average specific gravity of $4.0 \pm 0.4$, wherein the green light emitting fluorescent particles have an average specific gravity of $4.0 \pm 0.4$, and wherein the fluorescent particle mixture forming the fluorescent particle layer has a specific gravity of $4.0 \pm 0.4$.

8. A display apparatus comprising a fluorescent lamp, wherein the fluorescent lamp includes:

(A) a glass tube; and (B) a fluorescent particle layer, formed on an inner surface of the glass tube, having a fluorescent particle mixture of blue light emitting fluorescent particles, red light emitting fluorescent particles, and green light emitting fluorescent particles, wherein said fluorescent particle mixture is selected from the group consisting of $BaMgAl_{10}O_{17}$:Eu//$BaMgAl_{10}O_{17}$:Eu, Mn//$YVO_4$:Eu and $BaMgAl_{10}O_{17}$:Eu//$BaMgAl_{10}O_{17}$:Eu, Mn; $LaPo_4$:Ce, Tb//$YVO_4$:Eu, wherein if a specific gravity of the fluorescent particle mixture forming a portion of the fluorescent particle layer formed on the inner surface of the glass tube at one end portion is taken as $\rho_1$, and a specific gravity of the fluorescent particle mixture forming a portion of the fluorescent particle layer formed on the inner surface of the glass tube at another end portion is taken as $\rho_2$, the following formulas are satisfied:

$\rho_1 = 4.0 \pm 0.4$, $\rho_2 = 4.0 \pm 0.4$, and $|\rho_1 - \rho_2| \leq 0.4$.

* * * * *